(12) United States Patent
Kitahara et al.

(10) Patent No.: US 10,184,498 B2
(45) Date of Patent: Jan. 22, 2019

(54) CONTROL VALVE AND WORK VEHICLE HAVING THE CONTROL VALVE

(71) Applicant: Kubota Corporation, Osaka-shi (JP)

(72) Inventors: Haruka Kitahara, Sakai (JP); Seimei Nishikawa, Sakai (JP)

(73) Assignee: Kubota Corporation, Osaka (JP)

( * ) Notice: Subject to any disclaimer, the term of this patent is extended or adjusted under 35 U.S.C. 154(b) by 66 days.

(21) Appl. No.: 15/601,001

(22) Filed: May 22, 2017

(65) Prior Publication Data

US 2018/0135659 A1 May 17, 2018

(30) Foreign Application Priority Data

Nov. 16, 2016 (JP) .................. 2016-223575

(51) Int. Cl.
| | |
|---|---|
| *F16K 11/07* | (2006.01) |
| *F15B 11/13* | (2006.01) |
| *F15B 11/10* | (2006.01) |
| *F15B 11/00* | (2006.01) |
| *A01B 63/111* | (2006.01) |
| *F15B 13/04* | (2006.01) |
| *F15B 11/12* | (2006.01) |
| *A01B 63/102* | (2006.01) |

(52) U.S. Cl.
CPC ........... *F15B 11/13* (2013.01); *A01B 63/1117* (2013.01); *F15B 11/006* (2013.01); *F15B 11/10* (2013.01); *F15B 13/0402* (2013.01); *A01B 63/102* (2013.01); *A01B 63/1115* (2013.01); *F15B 11/12* (2013.01)

(58) Field of Classification Search
CPC .................................................. F15B 13/0402
USPC ....................................... 137/625.68, 625.69
See application file for complete search history.

(56) References Cited

U.S. PATENT DOCUMENTS

| | | | | | |
|---|---|---|---|---|---|
| 2,916,050 | A | * | 12/1959 | Ruhl ....................... | F15B 13/04 137/625.68 |
| 2,949,097 | A | * | 8/1960 | Vander .................... | F15B 13/04 137/596.12 |
| 4,522,373 | A | * | 6/1985 | Shelbourn ........... | F16K 11/0704 137/625.68 |
| 5,992,454 | A | * | 11/1999 | Schrag ................ | F15B 13/0402 137/596.2 |

FOREIGN PATENT DOCUMENTS

JP        2010174546 A        8/2010

* cited by examiner

*Primary Examiner* — John Fox
(74) *Attorney, Agent, or Firm* — The Webb Law Firm

(57) ABSTRACT

An inner oil passage (45) is formed inside a slidable spool (22). The slidable spool (22) defines, in its circumferential face, a first opening (46), a second opening (47) and a third opening (48). The first opening (46), the second opening (47) and the third opening (48) are communicated to the inner oil passage (45). When the slidable spool (22) is switched to a floating position (F), the first the first opening (46) is aligned with a first port end portion (25a), the second opening (47) is aligned with a second port end portion (26a), and the third opening (48) is aligned with a fourth port end portion (24a), respectively, and a first cylinder port and a second cylinder port are communicated to a tank port (24) via the inner oil passage (45).

10 Claims, 6 Drawing Sheets

(12)  US 10,184,498 B2

CONTROL VALVE AND WORK VEHICLE HAVING THE CONTROL VALVE

CROSS-REFERENCE TO RELATED APPLICATION

This application claims priority to Japanese Patent Application No. 2016-223575 filed Nov. 16, 2016, the disclosure of which is hereby incorporated in its entirety by reference.

BACKGROUND OF THE INVENTION

1. Field of the Invention

The present invention is directed to a control valve used with a work vehicle such as a tractor, and also directed to such a work vehicle having such a control valve.

2. Description of the Related Art

Such a control valve comprises a valve body that forms: a spool hole, a first cylinder port having a first port end portion opened to the spool hole, a second cylinder port having a second port end portion opened to the spool hole, a pump port having a third port end portion opened to the spool hole, and a tank port having a fourth port end portion opened to the spool hole. The control valve further comprises a slidable spool slidably mounted in the spool hole, the slidable spool being switchable to: a first driving position for communicating the first port end portion to the third port end portion, a second driving position for communicating the second port end portion to the third port end portion, and a floating position for communicating the first port end portion and the second port end portion to the fourth port end portion.

For instance, as shown in JP 2010-174546A, a tractor having a front loader is configured such that a slidable spool of a boom control valve is switchable to a floating position. When the slidable spool is switched to the floating position, an elevating side port and a lowering side port are communicated to a tank port via the slidable spool, thus allowing a floating work for causing a bucket to follow undulation of a working site.

The above-described control valve, when used for controlling a lift cylinder for a ground-working implement of a work vehicle, for instance, allows the floating work by switching the slidable spool to the floating position.

A conventional control valve of the above-noted type is known as illustrated in FIG. 9.

In FIG. 9, a valve body 70 includes a first tank port end portion 73 formed at a portion thereof aligned with a first port end portion 71 in a spool sliding direction, and a second tank port end portion 75 formed at a portion thereof aligned with a second port end portion 74 in the spool sliding direction. The first port end portion 71 is communicated to a first cylinder port (not shown) to be connected eventually to a cylinder. The second port end portion 74 is communicated to a second cylinder port (not shown) to be connected eventually to the cylinder. The first tank port end portion 73 and the second tank port end portion 76 are communicated to a tank port 77 via a valve-internal drain oil passage 76 to be connected eventually to a tank.

A slidable spool 72 has a first annular groove 78 and a second annular groove 79 formed in outer circumferential portions thereof. When the slidable spool 72 is switched to the floating position, communication is established between the first port end portion 71 and the first tank port end portion 73 via the first annular groove 78; and communication is established between the second port end portion 74 and the second tank port end portion 75 via the second annular groove 79, thus communicating the first cylinder port and the second cylinder port to the tank port 77.

In the case of the conventional arrangement, two tank port end portions are required to establish communication individually for the first port end portion included in the first cylinder port and the second port end portion included in the second cylinder port. This causes increase in length of the slidable spool, and thus increase in size of the valve body in the spool sliding direction. Consequently, the control valve is formed large.

Then, there is a need for a control valve that controls a subject cylinder to the floating state, and that can be formed compact.

SUMMARY OF THE INVENTION

In view of the above, there is provided a control valve comprising:
  a valve body that forms;
    a spool hole,
    a first cylinder port having a first port end portion opened to the spool hole,
    a second cylinder port having a second port end portion opened to the spool hole,
    a pump port having a third port end portion opened to the spool hole, and
    a tank port having a fourth port end portion opened to the spool hole; and
  a slidable spool slidably mounted in the spool hole, the slidable spool being switchable to;
    a first driving position for communicating the first port end portion to the third port end portion,
    a second driving position for communicating the second port end portion to the third port end portion, and
    a floating position for communicating the first port end portion and the second port end portion to the fourth port end portion;
  wherein:
    the slidable spool includes;
    an inner oil passage formed inside the slidable spool, and
    a first opening, a second opening and a third opening formed in a circumferential face of the slidable spool and communicated to the inner oil passage,
    the first opening, the second opening and the third opening being disposed side by side with a spacing therebetween in a sliding direction of the slidable spool; and
  wherein:
    when the slidable spool is switched to the floating position,
    the first opening is aligned with the first port end portion,
    the second opening is aligned with the second port end portion,
    the third opening is aligned with the fourth port end portion, and
    the first cylinder port and the second cylinder port are communicated to the tank port via the inner oil passage.

With this arrangement, when the slidable spool is switched to the floating position, the first opening is aligned with the first port end portion, the second opening is aligned with the second port end portion, and the third opening is aligned with the fourth port end portion. Whereby, the first cylinder port and the second cylinder port are communicated to the tank port and two oil chambers of the controlling-subject cylinder are connected to the tank.

Since the first port end portion and the second port end portion are communicated to the same port end portion (i.e. fourth port end portion), compared with the convention, the number of port end portions required for establishing communications of the first port end portions with the tank port can be reduced, and the length of the slidable spool can be shorter. Further, the size of the valve body in the spool sliding direction can be made smaller.

Therefore, the control valve capable of controlling a controlling-subject cylinder to the floating state can be formed compact.

According to one preferred embodiment, the slidable spool has a one end side portion that extends from an end portion of the inner oil passage to one end of the slidable spool;

the slidable spool includes a plug member hole formed inside the one end side portion and communicated to the inner oil passage, the plug member hole having an inside diameter greater than an inside diameter of the inner oil passage; and the plug member hole includes a spherical plug member for closing an opening formed in the inner oil passage and communicated to the plug member hole, and a screw member threadingly fitted to an inner wall face of the plug member hole and pressing the plug member against the opening.

With this arrangement, the plug member is pressed against the opening by the screw member, thereby to close this opening. Therefore, only by the simple operation of fastening the screw member, there can be obtained an inner oil passage whose opening is firmly and reliably closed.

According to one preferred embodiment, the one end side portion is slidably supported by the valve body; and an outside diameter of the one end side portion of the slidable spool is smaller than an outside diameter of a land portion provided in the slidable spool.

With the fastening of the screw member, the pressing of the plug member against the opening can sometimes be too strong, thus resulting in bulging of the one end side portion to the outer circumferential side. In such case too, with the above-described arrangement, since the outside diameter of the one end side portion before occurrence of such bulging is smaller than the outside diameter of the land portion, fitting between a portion of the valve body which portion slidably supports the one end side portion and this one end side portion will not be too tight, whereby irrespectively of occurrence of bulging, the slidable spool can be smoothly and lightly slidable.

According to one preferred embodiment, the control valve includes a detent mechanism for fixing the slidable spool at the floating position.

To this end, for example, the detent mechanism includes;

a positioning rod having one end portion forming a detent groove and the other end portion connected to the slidable spool, a detent spherical body engageable into the detent groove, and a spring configured to engaging the detent spherical body into the detent groove by its elastic force and fixing the slidable spool at the floating position.

Then, the floating position of the slidable spool in the control valve can be fixed in a reliable manner, so that the floating state of the controlling-subject cylinder can be made stable.

The present invention relates also to a work vehicle including the control valve having any one of the above-described arrangements.

This work vehicle includes a ground working implement unit mounted on a vehicle body and to a lift cylinder of the ground working implement unit, the first cylinder port and the second cylinder port of the control valve are connected.

With this arrangement, a work with setting the ground working implement to the floating state can be carried out by the compact control valve.

Further and other features and advantages achieved thereby will become apparent upon reading the following description with reference to accompanying drawings.

DETAILED DESCRIPTION OF PREFERRED EMBODIMENTS

Next, with reference to FIGS. 1 through 8, one embodiment of the present invention will be described. Unless explicitly indicated otherwise, in the following discussion, a direction of [F] shown in FIG. 1 is to be defined as the front side of a self-propelled vehicle body 1, a direction of [R] is to be defined as the rear side of the self-propelled vehicle body 1, the front side of the plane of illustration is to be defined as the left side of the self-propelled vehicle boy 1 and the back side of the plane of illustration is to be defined as the right side of the self-propelled body 1, respectively.

[General Arrangement of Front Loader]

Figure 1:
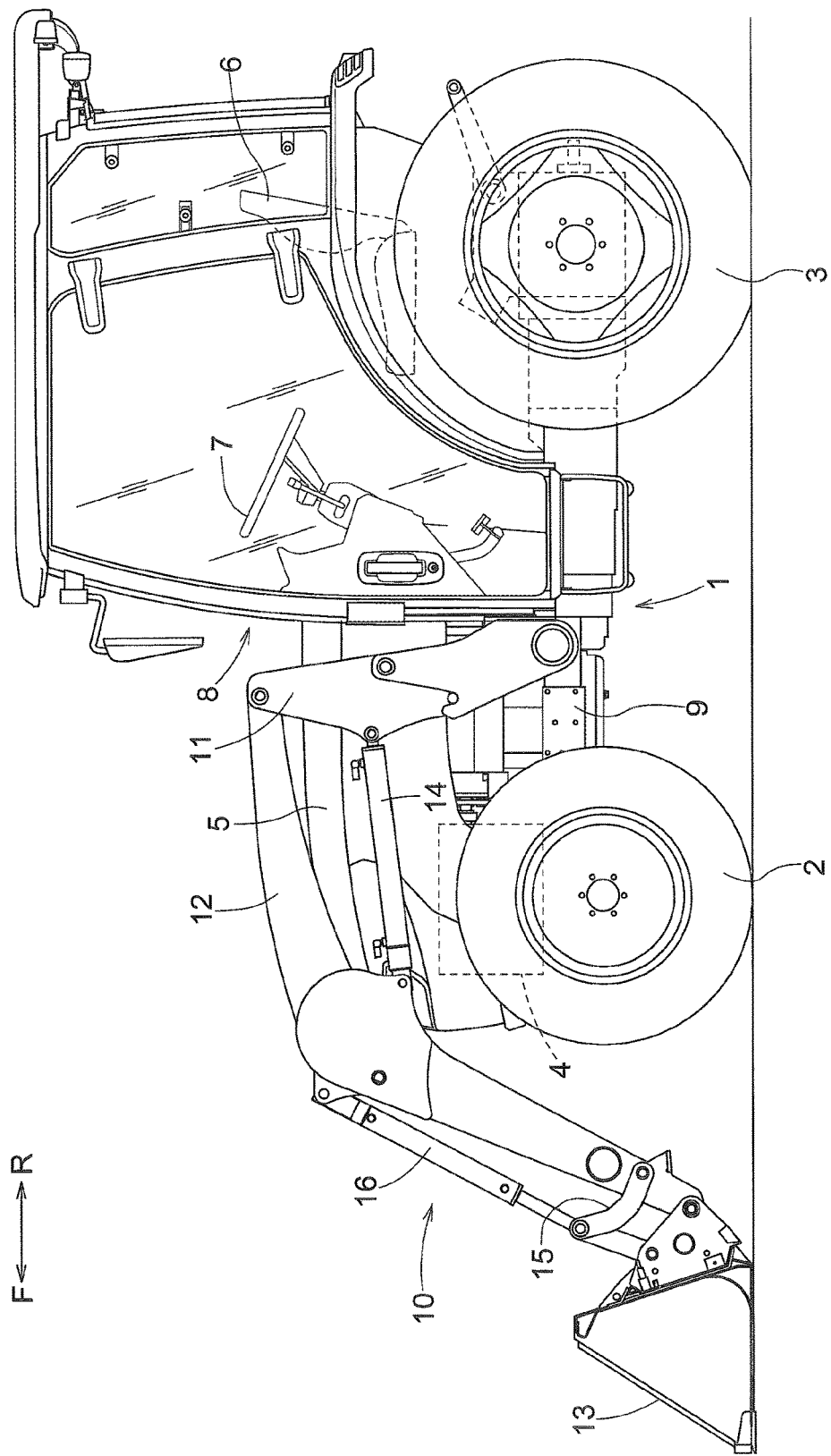
FIG. 1 is a view showing one embodiment, which in fact is a left side view showing a tractor in its entirety as one example of a work vehicle (same applies to the drawings up FIG. 8)

As shown in FIG. 1, a tractor (an example of work vehicle) includes a self-propelled vehicle body 1 mounting right and left steerable and drivable front wheels 2 and right and left drivable rear wheels 3. At a front portion of the self-propelled vehicle body 1, there is formed an engine section 5 having an engine 4. At a rear portion of the self-propelled vehicle body 1, there is formed a driving section 8 having a driver's seat 6 and a steering wheel 7. To the front portion of the self-propelled vehicle body 1, a front loader 10 is connected.

As shown in FIG. 1, the front loader 10 includes right and left post members 11, right and left booms 12 and one bucket 13 (an example of ground working implement unit). The right and left post members 11 are detachably attached to a vehicle body frame 9. The left boom 12 extends toward the vehicle body front side from the left post member 11 to be vertically pivotally operable. The right boom 12 extends toward the vehicle body front side from the right post member 11 to be vertically pivotally operable. The bucket 13 is supported at leading ends of the right and left booms 12 to be vertically pivotable between a scooping posture and an earth dumping posture.

Between the left boom 12 and the left post member 11, a left boom cylinder 14 (an example of lift cylinder) is connected. Between the right boom 12 and the right post member 11, a right boom cylinder 14 (an example of lift cylinder) is connected. Pivotal operations of the right and left booms 12 are effected by expanding/contracting operations of the boom cylinders 14.

Between the leading ends of the right and left booms 12 and a rear portion of the bucket 13, there is connected a right/left link mechanism 15 which is capable of bending and stretching. Between the left boom 12 and a left link mechanism 15, a left bucket cylinder 16 is connected. Between the right boom 12 and a right link mechanism 15, a right bucket cylinder 16 is connected. Pivotal operations of the bucket 13 are effected by bending and stretching of the link mechanisms 15 in association with bending and stretching of the bucket cylinders 16.

[Control Valve 20 for Boom Cylinders 14]
(Hydraulic Circuit)

Figure 2:
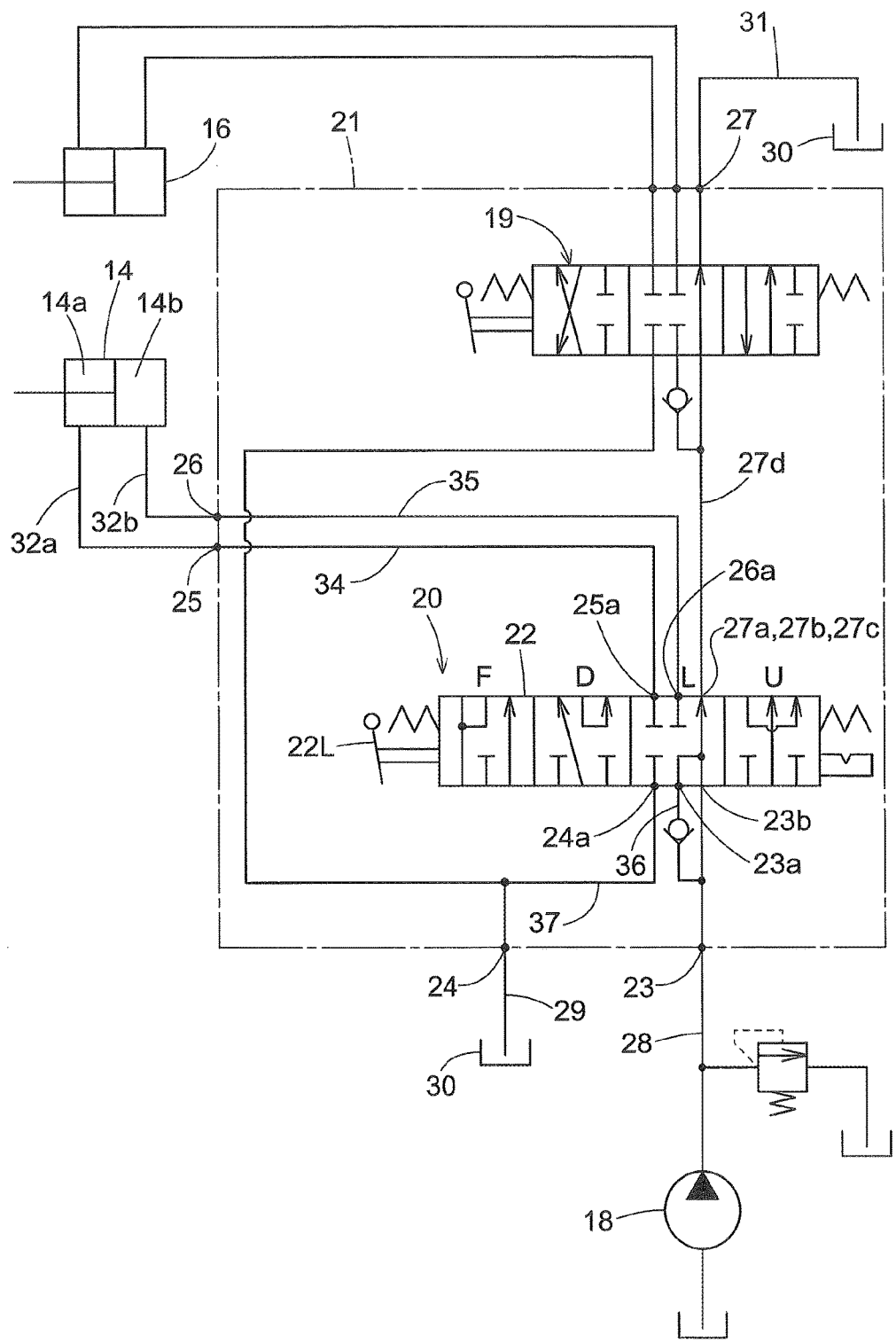
FIG. 2 is a hydraulic circuit diagram.
Figure 3:
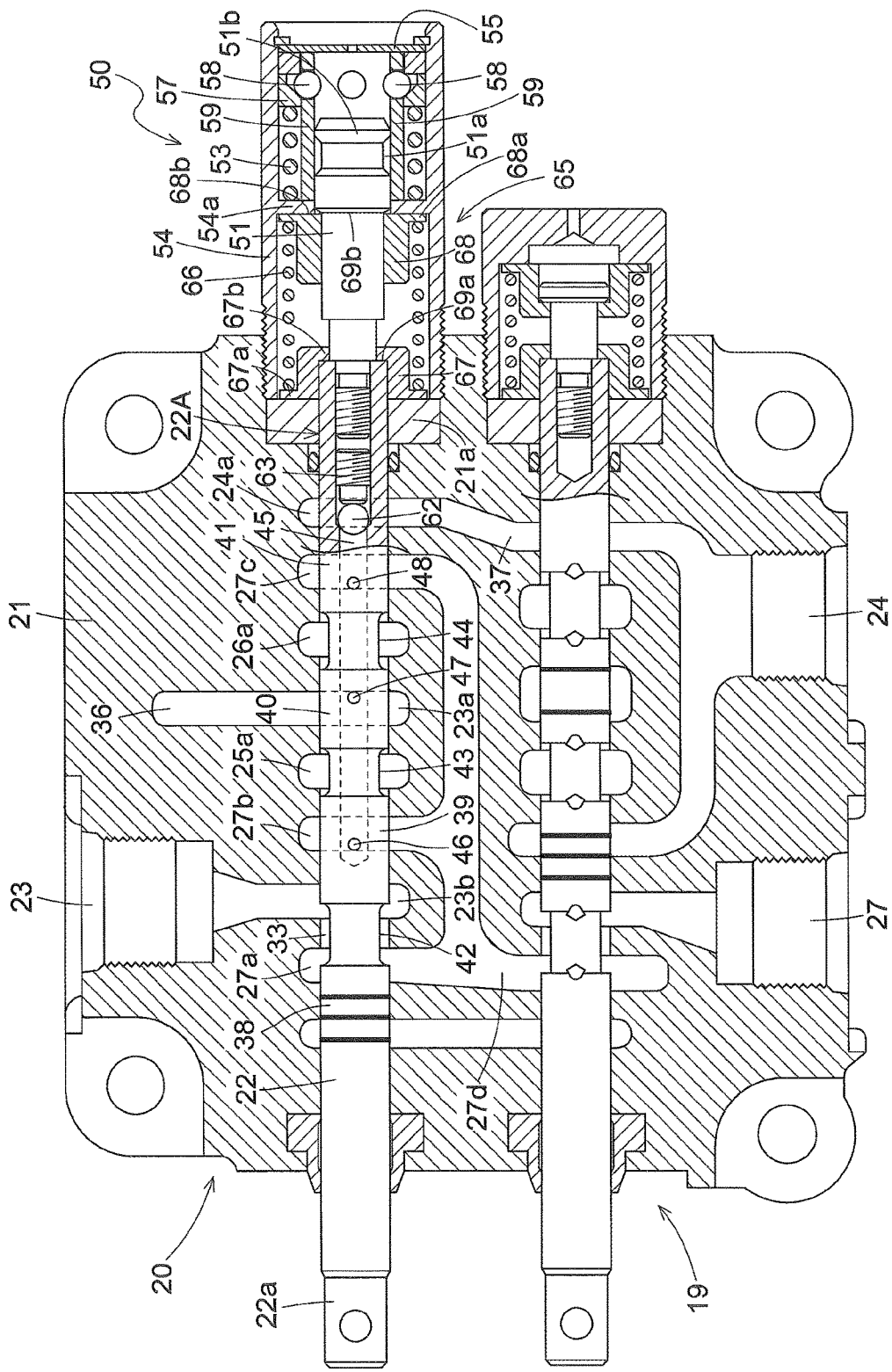
FIG. 3 is a section view showing a control valve under a lock controlling state.

FIG. 2 is a hydraulic circuit diagram. In this hydraulic circuit diagram shown in FIG. 2, one boom cylinder 14 of the right and left boom cylinders 14 is omitted from the illustrated and one bucket cylinder 16 of the right and left bucket cylinders 16 is also omitted from the illustration, respectively. FIG. 3 is a section view showing the control valve 20.

As shown in FIG. 2 and FIG. 3, the control valve 20 includes a valve body 21 and a slidable spool 22. The valve body 21 acts also as a valve body which constitutes a control valve 19 of the bucket cylinder 16.

As shown in FIG. 2 and FIG. 3, in an outer circumferential portion of the valve body 21, there are formed a pump port 23, a tank port 24, a first cylinder port 25, a second cylinder port 26 and a discharge port 27. The pump port 23 is connected to a hydraulic pump 18 via a valve-external oil feed passage 28. The tank port 24 is connected to a tank 30 via a valve-external first drain oil passage 29. The discharge port 27 is connected to the tank 30 via a valve-external second drain oil passage 31. The first cylinder port 25 is connected to a lowering side oil chamber 14a of the boom cylinder 14 via an operational oil passage 32a. The second cylinder port 26 is connected to an elevating side oil chamber 14b of the boom cylinder 14 via an operational oil passage 32b.

Inside the valve body 21, there are formed a spool hole 33, a first port end portion 25a, a second port end portion 26a, a third port end portion 23a, a fourth port end portion 24a, a fifth port end portion 27a, a sixth port end portion 27b, a seventh port end portion 27c and an eighth port end portion 23b. These first through eighth port end portions 25a, 26a, 23a, 24a, 27a, 27b, 27c, 23b are disposed side by side in a spaced relationship from each other in a direction of the axis of the spool hole 33. And, the first through eighth port end portions 25a, 26a, 24a, 23a, 27a, 27b, 27c, 23b are opened to the spool hole 33.

The first port end portion 25a is communicated to the first cylinder port 25 via an oil feed/discharge passage 34. Namely, the first port end portion 25a is provided in the first cylinder port 25. The second port end portion 26a is communicated to the second cylinder port 26 via an oil feed/discharge passage 35. Namely, the second port end portion 26a is provided in the second cylinder port 26. The third port end portion 23a is communicated to the pump port 23 via a valve-internal oil feed passage 36. Namely, the third port end portion 23a is provided in the pump port 23. The fourth port end portion 24a is communicated to the tank port 24 via a valve-internal drain passage (float oil passage) 37. Namely, the fourth port end portion 24a is provided in the tank port 24. The fifth port end portion 27a, the sixth port end portion 27b and the seventh port end portion 27c are communicated to the discharge port 27 via a bypass oil passage 27d. The bypass oil passage 27d extends through the control valve 19. The eighth port end portion 23b is communicated to the pump port 23.

The slidable spool 22 is slidably mounted in the spool hole 33. The slidable spool 22 forms, in its outer circumferential face, a first land portion 38, a second land portion 39, a third land portion 40 and a fourth land portion 41 (each of the first through fourth land portions 38-41 is an example of "land portion"). In the outer circumferential portion of the slidable spool 22, there are also formed a first annular groove 42, a second annular groove 43 and a third annular groove 44. The first annular groove 42 is positioned between the first land portion 38 and the second land portion 39. The second annular groove 43 is positioned between the second land portion 39 and the third land portion 40. The third annular groove 44 is positioned between the third land portion 40 and the fourth land portion 41.

Figure 7:
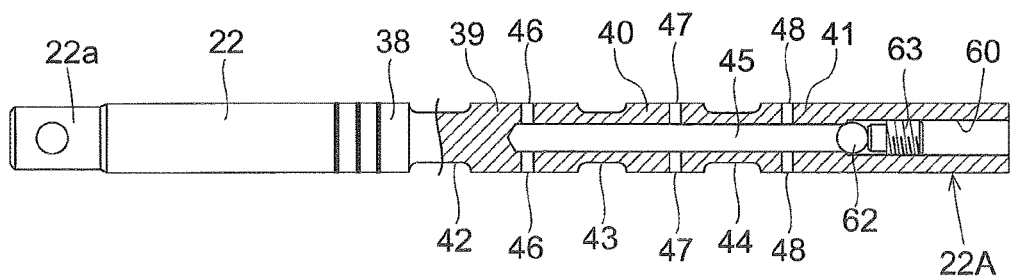
FIG. 7 is a section view of a slidable spool.

As shown in FIG. 3 and FIG. 7, inside the slidable spool 22, there is formed an inner oil passage 45 that extends in the sliding direction of the slidable spool 22. In the outer circumferential portion of the slidable spool 22, there are formed a first opening 46, a second opening 47 and a third opening 48. These first opening 46, second opening 47 and third opening 48 are disposed side by side in a spaced relationship with each other along the sliding direction of the slidable spool 22. And, the first opening 46, the second opening 47 and the third opening 48 are communicated to the inner oil passage 45. Further, the first opening 46, the second opening 47 and the third opening 48 are formed in the outer circumferential face of the slidable spool 22 at portions thereof positioned on the opposed outer sides in the slidable spool radial direction relative to the inner oil passage 45.

(Switching Operations of Slidable Spool 22)

As shown in FIG. 3, between one end side of the slidable spool 22 and the valve body 21, an urging mechanism 65 is provided. This urging mechanism 65 is configured to urge the slidable spool 22 to a locking position L (see FIG. 2). At the other end portion of the slidable spool 22, an operational portion 22a is formed. And, to this operational portion 22a, an operational tool 22L (see FIG. 2) such as a pivot lever is operably connected. When the operational tool 22L is operated, an operational force of this operational tool 22L and an operational force provided by the urging mechanism 65 can together realize switching operations of the slidable spool 22 to an elevating position U as a first driving position as shown in FIG. 2, the locking position L, a floating position F and a lowering position D as a second driving position.

(Locking Position L)

As shown in FIG. 3, in association with switchover of the slidable spool 22 to the locking position L (see FIG. 2), the control valve 20 is rendered into a locking controlling state, thus controlling the boom cylinder 14 to a stopped state.

More particularly, as shown in FIG. 3, when the slidable spool 22 is switched to the locking position L (see FIG. 2), the second land portion 39 and the third land portion 40 are located in distribution on the opposite sides across the first port end portion 25a; and the first port end portion 25a is closed by the second land portion 39 and the third land portion 40, whereby the oil feed/discharge passage 34 is closed. As the third land portion 40 is placed to face the third port end portion 23a, the third port end portion 23a is closed by the third land portion 40. The third land portion 40 and the fourth land portion 41 are located in distribution on the opposite sides across the second port end portion 26a; and the second port end portion 26a is closed by the third land portion 40 and the fourth land portion 41, whereby the oil feed/discharge passage 35 is closed.

Therefore, even if an oil pressure is supplied from the hydraulic pump 18 to the pump port 23, supply of this oil pressure to the boom cylinders 14 is stopped by the control valve 20 and also discharge of oil pressure from the boom cylinder 14 is stopped by the control valve 20 also, so that the boom cylinder 14 is controlled to stay under the stopped state. With this stop of the boom cylinder 14, the boom 12 is operated to a stopped state. In this case, the first annular groove 42 faces the fifth port end portion 27a and the eighth port end portion 23b, whereby the eighth port end portion 23b and the fifth port end portion 27a are communicated to each other via the first annular groove 42. With this, the oil pressure fed from the hydraulic pump 18 to the pump port 23 is fed via the eighth port end portion 23b and the fifth port end portion 27a to the bypass oil passage 27d and fed eventually to the control valve 19 of the bucket cylinder 16.

(Lowering Position D)

Figure 5:
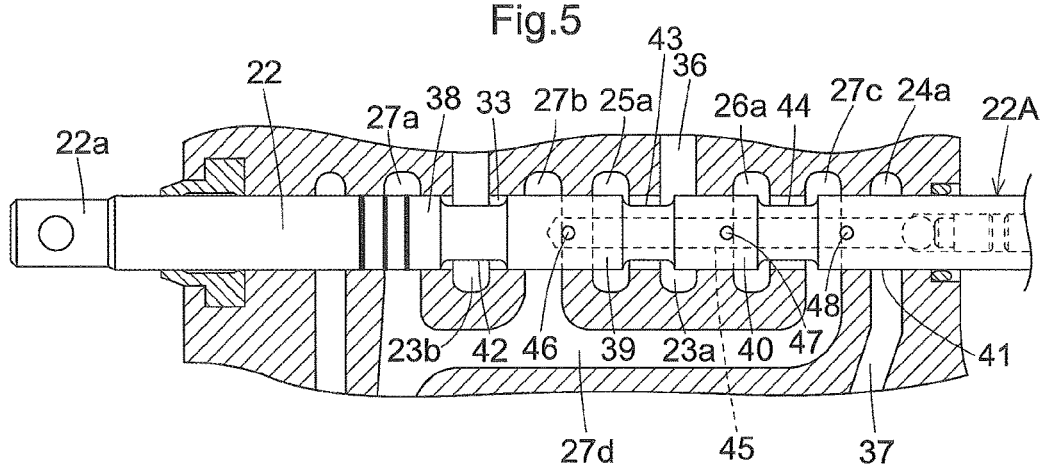
FIG. 5 is a section view showing the control valve under a lowering controlling state.

As shown in FIG. 5, when the slidable spool 22 is switched to the lowering position D (see FIG. 2), the control valve 20 is rendered into a lowering controlling state to control the boom cylinder 14 to the lowering side (contracting side).

More particularly, as shown in FIG. 5, when the slidable spool 22 is switched to the lowering position D (see FIG. 2), the second annular groove 43 is placed to face the first port end portion 25a and the third port end portion 23a, so that the first port end portion 25a and the third port end portion 23a are communicated to each other via the second annular groove 43, and the oil feed/discharge passage 34 is communicated to the valve-internal oil passage 36. With this, the first cylinder port 25 is communicated to the pump port 23, whereby pressure oil fed from the hydraulic pump 18 to the pump port 23 is fed via the control valve 20 to the operational oil passage 32a. This pressure oil fed to the operational oil passage 32a flows into the lowering side oil chamber 14a of the boom cylinder 14.

In this case, as the third annular groove 44 faces the second port end portion 26a and the seventh port end portion 27c, the second port end portion 26a and the seventh port end portion 27c are communicated to each other via the third annular groove 44, and the oil feed/discharge passage 35 is communicated to the bypass oil passage 27d. With this, the second cylinder port 26 is communicated to the discharge port 27 and the pressure oil in the elevating side oil chamber 14b of the boom cylinder 14 is discharged by the control valve 20 into the valve-external second drain oil passage 31 and eventually returned to the tank 30.

Therefore, when the slidable spool 22 is operated to the lowering position D, the hydraulic pressure supplied from the hydraulic pump 18 is fed via the control valve 20 to the lowering side oil chamber 14a of the boom cylinder 14, and by the hydraulic pressure of the lowering side oil chamber 14a, the boom cylinder 14 is contracted, and by this contracting boom cylinder 14, the boom 12 is lowered.

(Elevating Position U)

Figure 6:
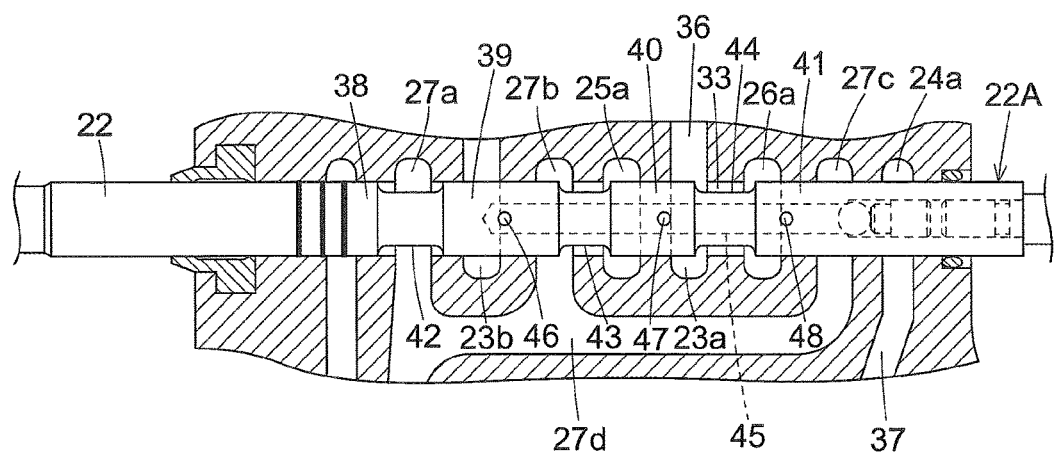
FIG. 6 is a section view showing the control valve under an elevating controlling state.

As shown in FIG. 6, when the slidable spool 22 is switched to the elevating position U (see FIG. 2), the control valve 20 is rendered into the elevating controlling state, thus controlling the boom cylinder 14 to the elevating side (expanding side).

Namely, as shown in FIG. 6, when the slidable spool 22 is switched to the elevating position U (see FIG. 2), the third annular groove 44 is placed to face the third port end portion 23a and the second port end portion 26a, so that the third port end portion 23a and the second port end portion 26a are communicated to each other via the third annular groove 44 and the oil feed/discharge passage 35 is communicated to the valve-internal oil passage 36. With this, the second cylinder port 26 is communicated to the pump port 23, whereby pressure oil fed from the hydraulic pump 18 to the pump port 23 is fed via the control valve 20 to the operational oil passage 32b. This pressure oil fed to the operational oil passage 32b flows into the elevating side oil chamber 14b of the boom cylinder 14.

In this case, as the second annular groove 43 faces the first port end portion 25a and the sixth port end portion 27b, the first port end portion 25a and the sixth port end portion 27b are communicated to each other via the second annular groove 43, and the oil feed/discharge passage 34 is communicated to the bypass oil passage 27d. With this, the first cylinder port 25 is communicated to the discharge port 27 and the pressure oil in the lowering side oil chamber 14a of the boom cylinder 14 is discharged by the control valve 20 into the operational oil passage 32a; and the discharged pressure oil is returned by the control valve 20 to the valve-external second drain oil passage 31 and eventually returned to the tank 30.

Therefore, when the slidable spool 22 is operated to the elevating position U, the hydraulic pressure supplied from the hydraulic pump 18 is fed via the control valve 20 to the elevating side oil chamber 14b of the boom cylinder 14, and by the hydraulic pressure of the elevating side oil chamber 14b, the boom cylinder 14 is expanded, and by this expanding boom cylinder 14, the boom 12 is elevated.

(Floating Position F)

Figure 4:
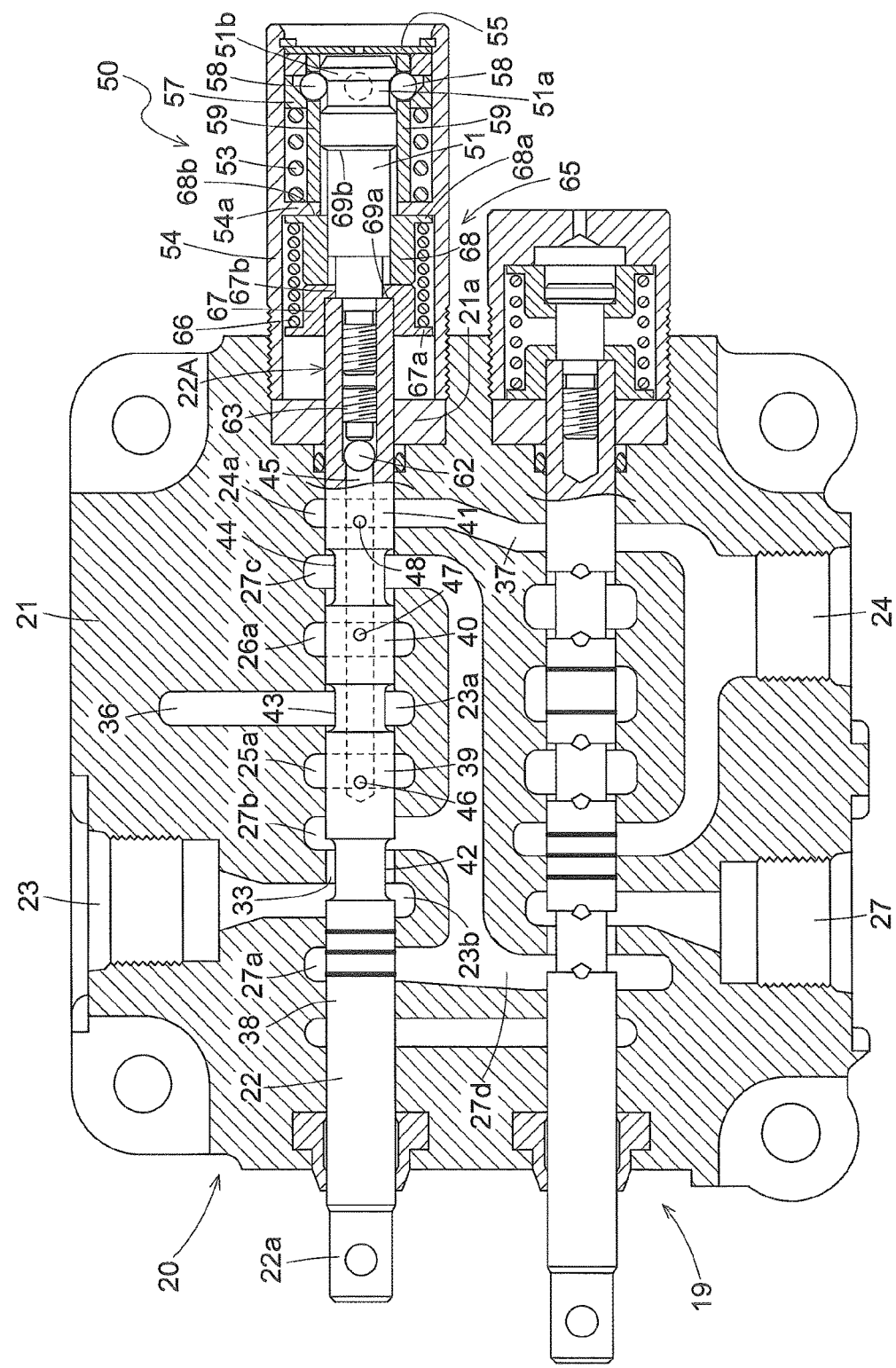
FIG. 4 is a section view showing a control valve under a floating controlling state.

As shown in FIG. 4, when the slidable spool 22 is switched to the floating position F (see FIG. 2), the control valve 20 is rendered to a floating controlling state to control the boom cylinder 14 to a free expansion/contraction state.

More particularly, as shown in FIG. 4, when the slidable spool 22 is switched to the floating position F (see FIG. 2), the first opening 46 is placed to face the first port end portion 25a, the second opening 47 is placed to face the second port end portion 26a, the third opening 48 is placed to face the fourth port end portion 24a, and the first port end portion 25a and the second port end portion 26a are communicated to the fourth port end portion 24a via the inner oil passage 45, whereby the feed/discharge oil passage 34 of the first cylinder port 25 and the feed/discharge oil passage 35 of the second cylinder port 26 are communicated to the valve-internal drain oil passage 37. With this, the first cylinder port 25 and the second cylinder port 26 are communicated to the tank port 24, and the operational oil passage 32a and the operational oil passage 32b are communicated via the control valve 20 to the valve-external first drain oil passage 29.

Therefore, the lowering side oil chamber 14a and the elevating side oil chamber 14b of the boom cylinder 14 are communicated by the control valve 20 to the tank 30; and the boom cylinder 14 can now freely expand/contract by a ground contacting reaction force acting on the boom 12 via the bucket 13. And, with this possibility of free expansion/contraction of the boom cylinder 14, boom 12 can now freely be lifted up/down.

As shown in FIG. 4, when the slidable spool 22 is switched to the floating position F (see FIG. 2), the slidable spool 22 will be fixed at the floating position F by means of a detent mechanism 50.

(Detent Mechanism 50)

As shown in FIG. 3 and FIG. 4, the detent mechanism 50 includes a detent groove 51a and a detent spherical body 58. The detent groove 51a is formed as an annular groove at an outer circumference portion of one end portion of a positioning rod 51. The other end portion of the positioning rod 51 is connected by threading connection to the inside of one end side portion of the slidable spool 22. The positioning rod 51 is movable together with the slidable spool 22. The detent spherical body 58 is accommodated within a support hole of a cylindrical spherical body holder 59 to be movable within a predetermined range in the radial direction of the spherical body holder 59 relative to this spherical body holder 59. The spherical body holder 59 is accommodated within a spring case 54. The spherical body holder 59 is bound by and between a stopper portion 54a of the spring case 54 and a stopper plate 55 to be fixed in position within the spring case 54. A spring 53 and a spherical body pressing ring 57 are accommodated between the spring case 54 and the spherical body holder 59. The spherical body pressing spring 57 is slidably fitted on the spherical body holder 59. The spherical body pressing ring 57 is pressed by the spring 53. The detent spherical body 58 is pressed toward the inner side of the spherical body holder 59 by an inclined face of the spherical body pressing ring 57.

In association with a sliding operation of the slidable spool 22 toward the floating position F, the end portion 51b of the positioning rod 51 will move beyond the detect spherical boy 58 toward the stopper plate 55, while the end portion 51b of the positioning rod 51 pressingly moves the detent spherical body 58 to the outer side of the spherical body holder 59. When the slidable spool 22 is positioned at the floating position F, the detent spherical body 58 is engaged into the detent groove 51a by elastic resilient force of the spring 53, whereby the detent spherical body 58 comes into engagement with the positioning rod 51 at the end portion of this positioning rod 51. With this engagement, the slidable spool 22 is fixed at the floating position F.

(Urging Mechanism 65)

As shown in FIG. 3 and FIG. 4, the urging mechanism 65 is provided between a one end side portion 22A of the slidable spool 22 and the valve body 21. The urging mechanism 65 includes a spring 66, a first spring receiving member 67 and a second spring receiving member 68.

The spring 66 is accommodated inside the spring case 54. One end side of the spring 66 is received and stopped by a stopper portion 67a of the first spring receiving member 67. The other end side of the spring 66 is received and stopped by a stopper portion 68a of the second spring receiving member 68. The first spring receiving member 67 and the second spring receiving member 68 are slidably fitted on the positioning rod 51.

As shown in FIG. 3, when the slidable spool 22 is located at the locking position L (see FIG. 2), the first spring receiving member 67 is brought into contact with and fixed in position against a supporting portion 21a of the valve body 21 by a pressing operation of the spring 66, and the second spring receiving member 68 is brought into contact with and fixed in position against the stopper portion 54a of the spring case 54 by the pressing action of the spring 66. Under this state, an inner circumferential side end portion 67b of the first spring receiving member 67 is placed in contact with a stepped portion 69a between the slidable spool 22 and the positioning rod 51; and an inner circumferential side end portion 68b of the second spring receiving member 68 is placed in contact with a stepped portion 69b of the positioning rod 51, whereby the slidable spool 22 is fixed at the locking position L.

When the slidable spool 22 is slid from the locking position L to the lowering position D and the floating position F, the stepped portion 69a comes into contact with the end portion 67b of the first spring receiving member 67, and the first spring receiving member 67 is slid by the slidable spool 22 toward the second spring receiving member 68, whereby the first spring receiving member 67 is moved away from the supporting portion 21a of the valve body 21. In the course of this, the spring 66 is pressed and elastically deformed by the first spring receiving member 67. As the first spring receiving member 67 is moved away from the supporting portion 21a, the first spring receiving member 67 is pressed by the spring 66, so that the slidable spool 22 is pressed by the first spring receiving member 67 toward the locking position L.

When the slidable spool 22 is slid from the locking position L toward the elevating position U, the stepped portion 69b comes into contact with the inner circumferential side end portion 68b of the second spring receiving member 68, and the second spring receiving member 68 is slid by the positioning rod 51 toward the first spring receiving member 67, whereby the second receiving member 68 is moved away from the stopper portion 54a of the spring case 54. In the course of this, the spring 66 is pressed and elastically deformed by the second spring receiving member 68. As the second spring receiving member 68 is moved away from the stopper portion 54a, the second spring receiving member 68 is pressed by the spring 66, and the slidable spool 22 is pressed by the second spring receiving member 68 toward the locking position L.

Thus, when the slidable spool 22 is switched to the elevating position U, the lowering position D and the floating position F, the first spring receiving member 67 and the second spring receiving member 68 are slidably urged by the spring 66, whereby the slidable spool 22 is slidably urged to the locking position L by the urging mechanism 65. When the slidable spool 22 arrives at the locking position L, the first spring receiving member 67 is brought into contact with and fixed to the supporting portion 21a by the spring 66, and the second spring receiving member 68 is brought into contact with and fixed to the stopper portion 64a by the spring 66, whereby the slidable spool 22 is fixed in position by the first spring receiving member 67 and the second spring receiving member 68. With this, the slidable spool 22 is fixed at the locking position L by the urging mechanism 65.

(Plug Member Hole 60)

Figure 8:
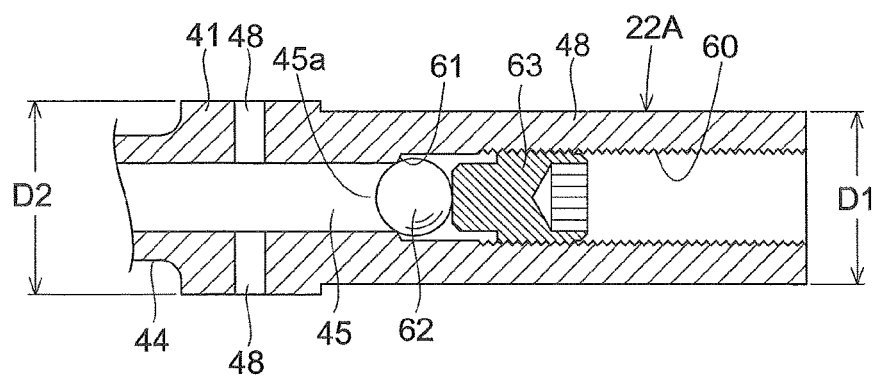
FIG. 8 is a section view showing a plug member attaching portion of the slidable spool.
Figure 9:
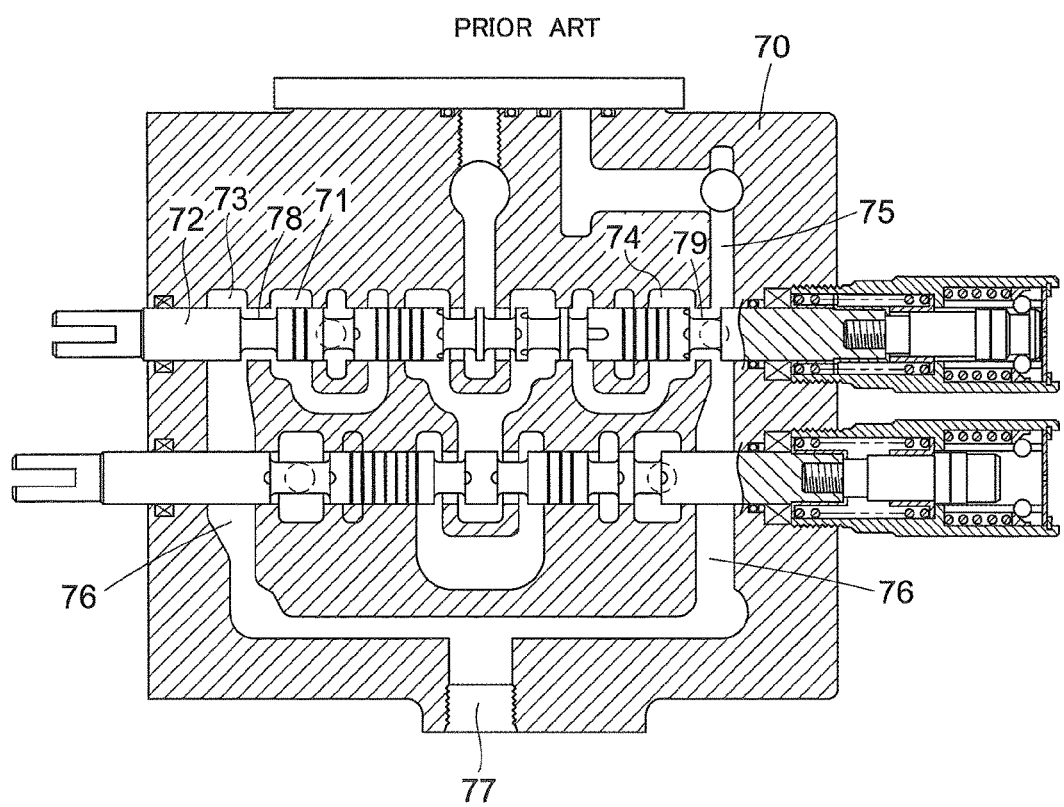
FIG. 9 is a section view showing a conventional control valve.

As shown in FIG. 3, FIG. 7 and FIG. 8, the one end side portion 22A of the slidable spool 22 extending from the portion where the end portion of the inner oil passage 45 is located to one end of the slidable spool 22 is slidably supported by the supporting portion 21a of the valve body 21. Inside the one end side portion 22A, a plug member hole 60 is formed. This plug member hole 60 is communicated to the inner oil passage 45 and opened to the one end of the slidable spool 22. The hole diameter of the plug member hole 60 is set larger than the inside diameter of the inner oil passage 45, so that a stepped portion 61 is formed between the inner oil passage 45 and the plug member hole 60. The plug member hole 60 includes a plug member 62 and a screw member 63. In the instant embodiment, the plug member 62 is provided as a spherical body. The screw member 63 is threaded to the inner wall face of the plug member hole 60. The plug member 62 is pressed against the stepped portion 61 by a fastening force of the screw member 63, thus closing an opening 45a of the inner oil passage 45 which is communicated to the plug member hole 60. An outside diameter of the one end side portion 22A of the slidable spool 22 is made smaller than an outside diameter D2 each of the first through fourth land portions 38-41.

The inner oil passage 45 is formed by drilling a hole from one end of the slidable spool 22 to its inside. In this case, the inner oil passage 45 will be provided with the opening 45a toward one end of the slidable spool 22 and this opening 45a is closed by the plug member 62. Even when the one end side portion 22A bulges to the outer circumferential side by pressing of the plug member 62 against the stepped portion 61 by the fastening force of the screw member 63, since the outside diameter D1 of the one end side portion 22A is preliminarily made smaller than the outside diameter D2 each of the first through fourth land portions 38-41, in spite of such bulging of the one end side portion 22A, this one end side portion 22A can smoothly slide relative to the supporting portion 21a.

Other Embodiments (1) In the foregoing embodiment, the first opening 46, the second opening 47 and the third opening 68 are formed on the opposed outer sides in the slidable spool radial direction relative to the inner oil passage 45, in the outer circumferential face of the slidable spool 22. Instead, they may be formed only on one side in the slidable spool radial direction relative to the inner oil passage 45.

(2) In the foregoing embodiment, the outside diameter D1 of the one end side portion 22A is made smaller than the outside diameter D2 each of the first through fourth land portions 38-41. Instead, the diameters D1, D2 may be the same.

(3) In the foregoing embodiment, the spherical plug member 62 is disclosed. Instead, it is also possible to use a plug member of various other shapes such as a conical shape.

(4) In the foregoing embodiment, there was shown an exemplary arrangement for controlling the boom cylinder 14 of the front loader 10 of a tractor. Instead, an arrangement can be provided for controlling lifting of a ground working implement unit of various kinds of work vehicle, aside from the bucket 13 of the front loader, such as a cylinder for lifting up/down a bucket of a wheel loader, a harvesting front-processing unit of a combine, a seed planting work unit of a seed planter, etc.

(5) In the foregoing embodiment, the control valve relating to the present invention is applied to a boom cylinder of a front loader for a tractor. The invention is not limited thereto. Instead, the control valve relating to the present invention can be used also as a control valve for controlling a lifting cylinder for a ground working implement unit of various kinds of work vehicle, e.g. a boom cylinder of a wheel loader, a cylinder for lifting up/down a harvesting front-processing unit of a combine, a cylinder for lifting up/down a planting implement unit of a planter, etc.

Further, in the foregoing embodiment, the work vehicle relating to the present invention is applied to a tractor. However, the invention is limited not limited thereto. Instead, the work vehicle relating to the present invention can be applied also to various kinds of work vehicle such as a wheel loader, a combine, a seed planter, etc.

What is claimed is:

1. A control valve comprising:
a valve body that forms:
 a spool hole,
 a first cylinder port having a first port end portion opened to the spool hole,
 a second cylinder port having a second port end portion opened to the spool hole,
 a pump port having a third port end portion opened to the spool hole, and
 a tank port having a fourth port end portion opened to the spool hole; and
a slidable spool slidably mounted in the spool hole, the slidable spool being switchable to:
 a first driving position for communicating the first port end portion to the third port end portion,
 a second driving position for communicating the second port end portion to the third port end portion, and
 a floating position for communicating the first port end portion and the second port end portion to the fourth port end portion;
wherein:
the slidable spool includes;
 an inner oil passage formed inside the slidable spool, and
 a first opening, a second opening and a third opening formed in a circumferential face of the slidable spool and communicated to the inner oil passage,
 the first opening, the second opening and the third opening being disposed side by side with a spacing therebetween in a sliding direction of the slidable spool; and
wherein:
when the slidable spool is switched to the floating position,
the first opening is aligned with the first port end portion,
the second opening is aligned with the second port end portion,
the third opening is aligned with the fourth port end portion, and
the first cylinder port and the second cylinder port are communicated to the tank port via the inner oil passage.

2. The control valve as defined in claim 1, wherein:
the slidable spool has a one end side portion that extends from an end portion of the inner oil passage to one end of the slidable spool;
the slidable spool includes a plug member hole formed inside the one end side portion and communicated to the inner oil passage, the plug member hole having an inside diameter greater than an inside diameter of the inner oil passage; and
the plug member hole includes a spherical plug member for closing an opening formed in the inner oil passage and communicated to the plug member hole, and a screw member threadingly fitted to an inner wall face of the plug member hole and pressing the plug member against the opening.

3. The control valve as defined in claim 2, wherein:
the one end side portion is slidably supported by the valve body; and
an outside diameter of the one end side portion of the slidable spool is smaller than an outside diameter of a land portion provided in the slidable spool.

4. The control valve as defined in claim 1, wherein the valve body includes a detent mechanism for fixing the slidable spool at the floating position.

5. The control valve as defined in claim 4, wherein:
the detent mechanism includes:
a positioning rod having one end portion forming a detent groove and the other end portion connected to the slidable spool,
a detent spherical body engageable into the detent groove, and
a spring configured to engaging the detent spherical body into the detent groove by its elastic force and fixing the slidable spool at the floating position.

6. A work vehicle comprising:
a vehicle body;
a ground working implement unit mounted on the vehicle body, the ground working implement unit having a lift cylinder for lifting up/down the ground working implement unit;
a control valve comprising:
a valve body that forms:
a spool hole,
a first cylinder port having a first port end portion opened to the spool hole,
a second cylinder port having a second port end portion opened to the spool hole,
a pump port having a third port end portion opened to the spool hole, and
a tank port having a fourth port end portion opened to the spool hole; and
a slidable spool slidably mounted in the spool hole, the slidable spool being switchable to:
a first driving position for communicating the first port end portion to the third port end portion,
a second driving position for communicating the second port end portion to the third port end portion, and
a floating position for communicating the first port end portion and the second port end portion to the fourth port end portion;
wherein:
the slidable spool includes;
an inner oil passage formed inside the slidable spool, and
a first opening, a second opening and a third opening formed in a circumferential face of the slidable spool and communicated to the inner oil passage,
the first opening, the second opening and the third opening being disposed side by side with a spacing therebetween in a sliding direction of the slidable spool; and
wherein:
when the slidable spool is switched to the floating position,
the first opening is aligned with the first port end portion,
the second opening is aligned with the second port end portion,
the third opening is aligned with the fourth port end portion, and
the first cylinder port and the second cylinder port are communicated to the tank port via the inner oil passage.

7. The work vehicle as defined in claim 6, wherein:
the slidable spool has a one end side portion that extends from an end portion of the inner oil passage to one end of the slidable spool;
the slidable spool includes a plug member hole formed inside the one end side portion and communicated to the inner oil passage, the plug member hole having an inside diameter greater than an inside diameter of the inner oil passage; and
the plug member hole includes a spherical plug member for closing an opening formed in the inner oil passage and communicated to the plug member hole, and a screw member threadingly fitted to an inner wall face of the plug member hole and pressing the plug member against the opening.

8. The work vehicle as defined in claim 7, wherein:
the one end side portion is slidably supported by the valve body; and
an outside diameter of the one end side portion of the slidable spool is smaller than an outside diameter of a land portion provided in the slidable spool.

9. The work vehicle as defined in claim 6, wherein the valve body includes a detent mechanism for fixing the slidable spool at the floating position.

10. The work vehicle as defined in claim 9, wherein:
the detent mechanism includes:
a positioning rod having one end portion forming a detent groove and the other end portion connected to the slidable spool,
a detent spherical body engageable into the detent groove, and
a spring configured to engaging the detent spherical body into the detent groove by its elastic force and fixing the slidable spool at the floating position.

* * * * *